United States Patent Office 3,544,474
Patented Dec. 1, 1970

3,544,474
OXIDATION-RESISTANT ROSIN
SOAP COMPOSITION
Charles O. Shaffer, Panama City, Fla., assignor, by mesne assignments, to Arizona Chemical Company, New York, N.Y., a corporation of Delaware
No Drawing. Filed Dec. 7, 1967, Ser. No. 688,680
Int. Cl. C11d 15/04; C11b 5/00
U.S. Cl. 252—131                                    7 Claims

ABSTRACT OF THE DISCLOSURE

An oxidation-resistant rosin soap composition is prepared by forming a solution of an alkali metal soap of disproportionated rosin, adding sufficient finely-divided microporous hydrous calcium silicate to form a free-flowing powder, and drying the resulting product.

---

This invention relates to an oxidation-resistant and storage-stable rosin soap composition of the type used in making detergent mixtures, in sizing paper, and for other similar uses. The invention includes the rosin soap composition itself, its method of preparation, and detergent and paper sizing compositions containing it.

The soaps or sizes obtained by saponifying ordinary wood rosin with caustic soda, sodium carbonate or other alkali metal alkalis and drum-drying the product are well known articles of commerce. It is a known fact, however, that they are subject to darkening, smoldering and other forms of oxidative deterioration when the dried products are stored in the presence of air. For this reason, it has become standard commercial practice to add chemical antioxidants such as secondary diarylamines or phenothiazine in amounts up to about 1% on the weight of the rosin soap. The presence of these chemical antioxidants is, however, undesirable for some uses of the rosin soaps; moreover, they do not fully protect the soaps of tall oil rosins, which contain little or none of the natural antioxidants that have assisted in stabilizing ordinary wood and gum rosins.

My present invention is based on the discovery that dry rosin soaps of alkali metals, such as the sodium and potassium soaps of wood rosins, gum rosin and tall oil rosin, can be protected against spontaneous combustion by a particular combination of procedures. These consist in first disproportionating the rosin, then converting it into an alkali metal soap solution, and finally absorbing this solution into a sufficient quantity of a particular finely divided calcium silicate product to form a powdery material. When this material is dried there is obtained a soap composition that can easily be shipped and stored and which is fully protected against oxidative deterioration during storage.

The procedures for disproportionating rosin are well known. A disproportionation catalyst, which is preferably a platinum or palladium catalyst as described in U.S. Pat. No. 2,138,183, is first dispersed into the molten rosin which is then heated to disproportionation temperatures on the order of 180° C.–325° C. for a sufficient time, on the order of about 1–4 hours, to obtain a substantial reduction in the abietic acid content of the rosin. Usually the heating is continued until the abietic acid content is below about 5%, as determined by ultraviolet examination, and in many cases the abietic acid content is 1% or lower. For some purposes, however, and particularly in the production of rosin sizes for paper manufacture, an extremely low abietic acid content is unnecessary, and it will be understood that the term "disproportionated rosin" as used herein will include rosins wherein the abietic acid content may be as high as 5%–10%.

As is indicated above, the rosin after disproportionation to the desired degree is converted into an aqueous solution of an alkali metal soap, as by reaction with a solution of sodium or potassium hydroxide or carbonate. Preferably the amount of water is such as to produce a soap solution containing about 60% to 75% solids. The ratio of alkali metal compound to rosin may be such as to produce a soap or size of relatively low free rosin content, as about a 90%–95% saponified rosin, or a high-free rosin size containing about 70% to 80% of saponified rosin may be produced. In either case, however, the resulting soap dispersion is then distended on a finely-divided, microporous hydrous calcium silicate, which is added in a quantity sufficient to dry the solution.

The microporous hydrous calcium silicates used in practicing the present invention are obtained by reacting diatomaceous silica with lime. Ordinarily they contain about 20%–30% lime as CaO, about 50%–55% of $SiO_2$ and show about 10%–20% loss on ignition, most of which represents water of hydration. They also contain minor amounts of the minerals normally found in the diatomaceous earths from which they are prepared, the principal ones being $Al_2O_3$ and $Fe_2O_3$.

These materials resemble their parent diatomaceous earths in particle size, bulk density and surface area. They range from about 1.5 to 4 microns in particle size, with not more than 3%–5% being retained on a 325 mesh screen, their bulk density is in the range of 5–15 lbs. per cu. ft., and their surface area ranges from about 90 to 200 square meters per gram. They have excellent water-absorption and oil-absorption characteristics, and are used commercially to convert liquid products into easily handled, flowable and dry powders.

The preferred calcium silicate of the following examples was made by using a diatomaceous earth from the Lompoc, California deposits and therefore contained 3.6% of $Al_2O_3$ and 1.2% of $Fe_2O_3$. It analyzed 25.1% CaO, 54.3% $SiO_2$ and its loss on ignition was 14%; its average particle size was about 2 microns and only about 1% was retained on a 325 mesh screen. It had a specific gravity of 2.45, a bulk density of 5.4 lbs. per cu. ft., a surface area of 95 square meters per gram, and a water absorption of 560 weight percent. It was a commercial product, being sold as "Micro-Cel E."

Although any suitable apparatus may be used to obtain the dry mixture of disproportionated rosin soap solution and hydrous calcium silicate, I greatly prefer to use the equipment sold commercially as the "Littleford-Lodige Mixer." The body of his mixer is essentially cylindrical in shape, with the axis positioned horizontally, and is mounted for rotation. It contains a set of stationary plows that maintain its solid contents in an essentially fluidized condition while the liquid to be absorbed is introduced through sprays set in the upper part of the cylinder immediately above high speed blending choppers, which ensure absolute dispersion of the liquid phase as it enters. This type of equipment produces a uniform powder that can easily be fed into a rotary drum dryer and dried by contact with a stream of hot gases.

The proportion of microporous hydrous calcium silicate to disproportionated rosin soap may be varied throughout a relatively wide range. A dry, free-flowing and storage-stable product is usually obtainable with from about 20% to about 50% of the hydrous calcium silicate, based on the dry weight of the mixture. This will provide a soap or size composition containing from about 50% to about 80% by weight of the disproportionated rosin soap, which is an optimum range for many purposes.

It is quite unexpected to find that a dry rosin soap can be protected from such types of oxidative deterioration as smoldering, discoloration and spontaneous combustion by distending it on a microporous powder. It has been found, however, that this is accomplished when the powder is the microporous calcium silicate that has been described. This is indeed surprising, for it would ordinarily be expected that oxidative deterioration would be enhanced, rather than prevented, by extending the surface area of the rosin soap. It is particularly surprising to find that tall oil rosin soap can be protected in this manner, for the alkali metal soaps or sizes of this type of rosin are not fully protected even by the chemical antioxidants such as diphenylamine that are now used commercially to protect wood rosin size.

The invention will be further described and illustrated by the accompanying examples to which, however, it is not limited.

EXAMPLE 1

A disproportionated tall oil rosin having the following characteristics was used.

Acid number: 167
Unspaonifiables, percent: 7.0
Abietic acid (U.V.), percent: 0.7
Optical rotation: +53
Softening point, ° C.: 74

A solution of 36 grams of NaOH in 160 grams of hot water was prepared and added to 337 grams of disproportionated tall oil rosin in portions and with stirring. The resulting 70% solids soap dispersion was mixed uniformly with 120 grams of the microporous hydrous calcium silicate described above as "Micro-Cel E," which resulted in a free-flowing powder. This was dried in an oven at 110° C. for 1 hour to remove the water that had been contained in the soap solution.

The resulting soap composition was easy to store and handle, and was resistant to spontaneous combustion without the addition of oxidation inhibitors. It will be understood that such antioxidants as diphenylamine and phenothiazine must be added to ordinary dry rosin soaps or sizes in amounts of about 0.1% to 1% to prevent spontaneous combustion on storage in contact with air, so the advantages obtained by admixture with the hydrous calcium silicate absorbent are evident.

This soap composition is well suited for use as an emulsifying agent in preparing the aqueous butadiene-styrene emulsions used in synthetic GRS rubber. It can also be used for admixture with alkali metal salts of higher fatty acids in preparing detergent compositions.

The composition is particularly well suited for sizing paper, since both the disproportionated rosin soap and the calcium silicate are utilized. Thus a 1%–2% aqueous dispersion is easily prepared by stirring the composition into water; this may be added to a suspension of beaten paper pulp in amounts such as to apply about 1%–2% on the dry weight of the paper. After agitating to obtain uniform dispersion there is added about 1%–2% of papermakers' alum as a dilute solution and the pulp is made into paper by the usual procedures. The calcium silicate, which is white in color, increases the basis weight of the paper.

EXAMPLE 2

A solution of a sodium soap of disproportionated wood rosin was used. This solution had an acid number of 11 and a solids content of 71.6%. To 75 parts by weight of the soap solution there was admixed uniformly 25 parts of the microporous hydrous calcium silicate described above as "Micro-Cel E," which resulted in a dry powder. This was dried in an oven at 110° C. for one hour to remove the water which had been contained in the soap solution.

The resulting dry soap composition was easy to handle and was resistant to spontaneous combustion without the addition of oxidation inhibitors.

EXAMPLE 3

For purposes of comparison a sodium soap of a non-disproportionated tall oil rosin was prepared as a 70% solids dispersion by the procedure described in Example 1. The rosin was a product sold commercially as "Acintol R," Type S, having an acid number of 172, a saponification value of 180 and a softening point of 79° C. This dispersion was converted into a free-flowing powder by admixture with one-third its weight of "Micro-Cel E," followed by drying for 1 hour at 110° C.

A 70% solids dispersion of the disproportionated tall oil rosin soap of Example 1 was prepared, as described in that example, and was evaporated to dryness in a vcauum oven without admixing "Micro-Cel E."

Samples of these two materials and of the products of Examples 1 and 2 were subjected to a standard laboratory test for storage stability. Supports containing layers of the powders under test about two inches thick were put into a vented oven at 150° C. and the time required for each sample to start to smolder was noted. This method simulates in an accelerated manner the actual oxidation of dry rosin soaps in storage.

The non-disproportionated tall oil rosin soap-"Micro-Cel E" mixture of Example 2 began to smolder after 99 minutes. The straight disproportionated tall oil rosin soap of that example, which contained no "Micro-Cel E," began to smolder after 103 minutes.

The products of Examples 1 and 2 did not smolder at all although they were left in the oven for a full working day—about 8 to 9 hours. When removed at the end of the day they were found to be in good condition.

I claim:

1. An oxidation-resistant rosin soap composition consisting essentially of a dry mixture of about 50%–80% by weight of an alkali metal soap of a disproportionated rosin distended on about 50%–20% of a finely-divided microporous hydrous calcium silicate.

2. A composition according to claim 1 wherein the alkali metal soap is a sodium soap.

3. A composition according to claim 1 wherein the soap is an alkali metal soap of disproportionated tall oil rosin.

4. A composition according to claim 3 containing about 75% by weight of the disproportionated tall oil rosin soap and about 25% by weight of the microporous hydrous calcium silicate.

5. A method of producing the oxidation-resistant rosin soap composition of claim 1 which comprises preparing an aqueous dispersion of an alkali metal soap of a disproportionated rosin, absorbing this solution into a quantity of a finely-divided microporous hydrous calcium silicate such as to provide about 20% to 50% by weight thereof in the final product, and evaporating the water from the mixture.

6. A method according to claim 5 in which the alkali metal soap of disproportionated rosin is a sodium soap.

7. A method according to claim 5 in which the soap is an alkali metal soap of disproportionated tall oil rosin.

References Cited

UNITED STATES PATENTS

| 2,041,744 | 5/1936 | Cummins | 252—131 |
| 3,377,334 | 4/1968 | McBride et al. | 260—398.5 X |
| 3,423,389 | 1/1969 | Wheelus | 260—398.5 X |

OTHER REFERENCES

Johns-Manville: Data Sheet FF–22M, Celite Technical Data, Micro-Cel and Celkate Synthetic Silicates, published July 1965, pp. 1 and 3.

LEON D. ROSDOL, Primary Examiner

D. L. ALBRECHT, Assistant Examiner

U.S. Cl. X.R.

117—100; 162—180, 181; 252—133, 259.5, 397; 260—398.5, 413, 427